Nov. 26, 1968     K. ROCHLA     3,413,175
DEVICE FOR WELDING TOGETHER THE TERMINAL EDGES OF
SUPERPOSED LAYERS OF THERMOPLASTIC MATERIAL
Filed April 8, 1963     10 Sheets-Sheet 1
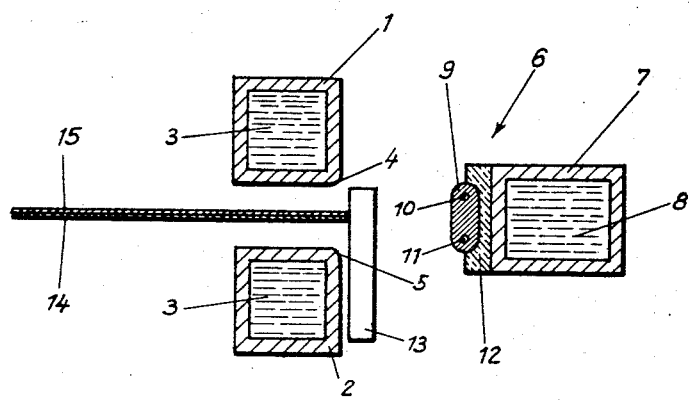
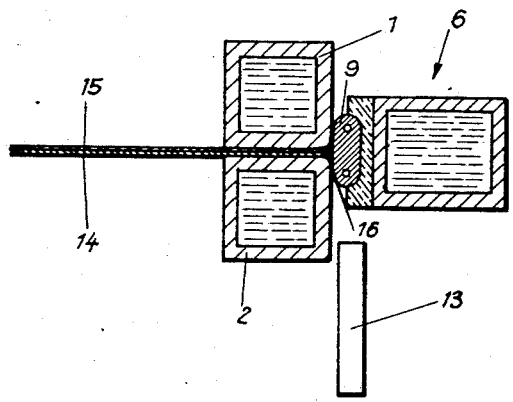
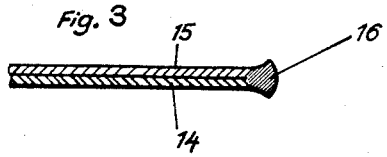

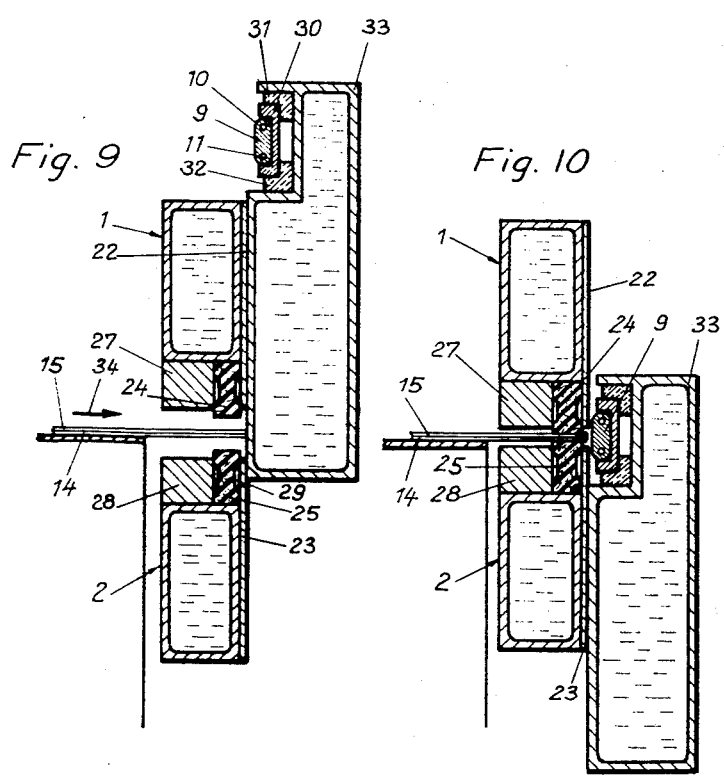
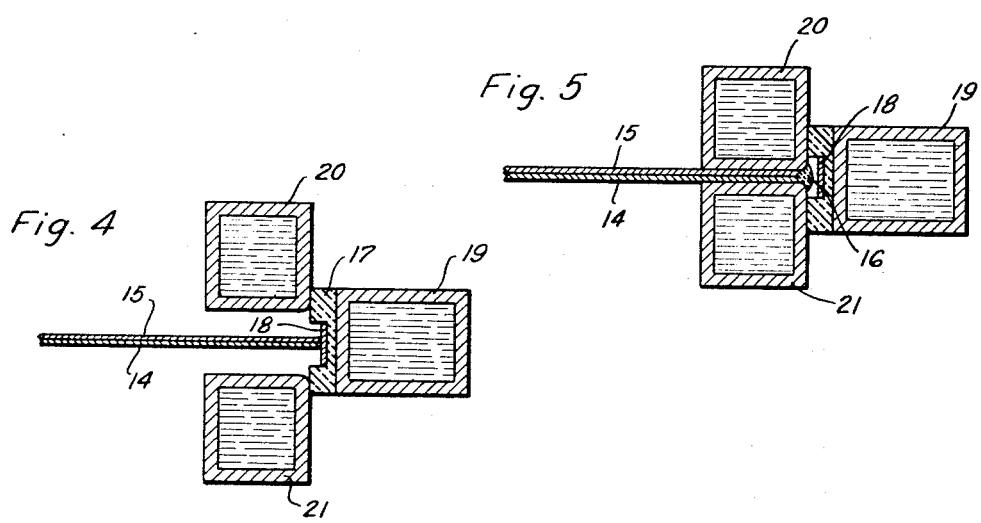

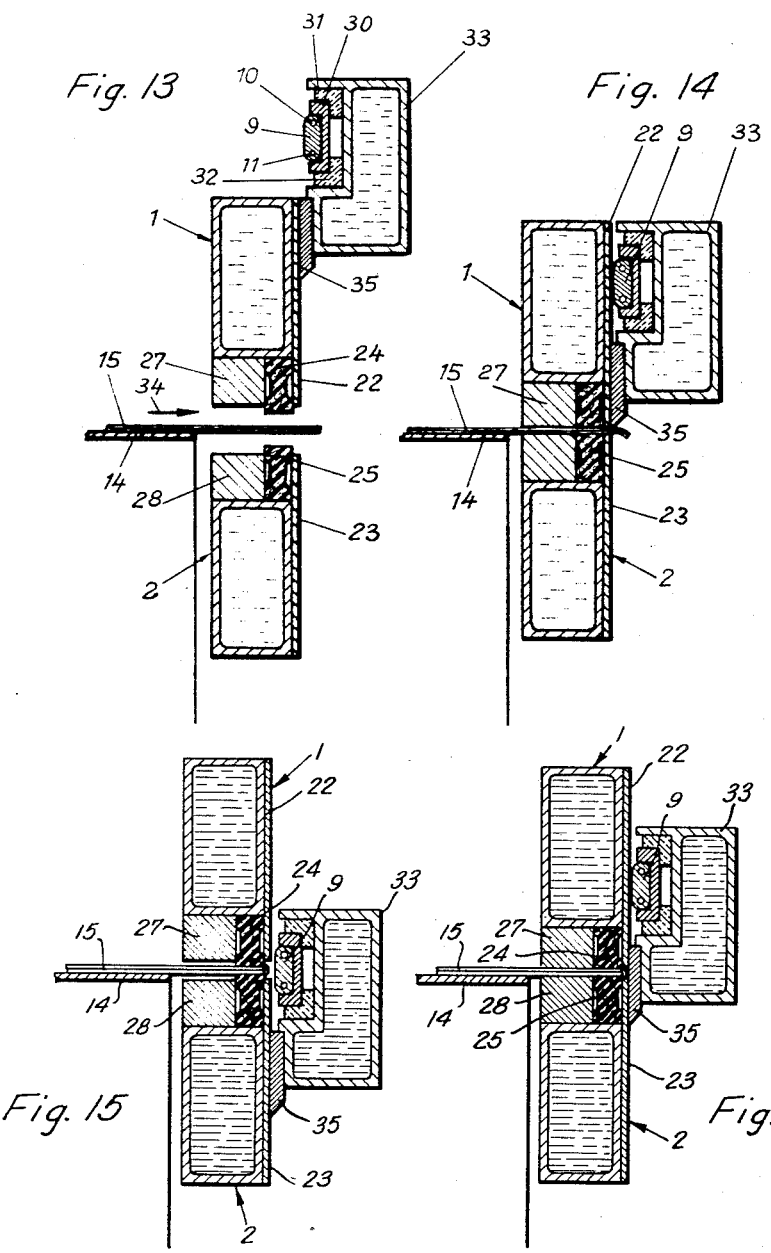

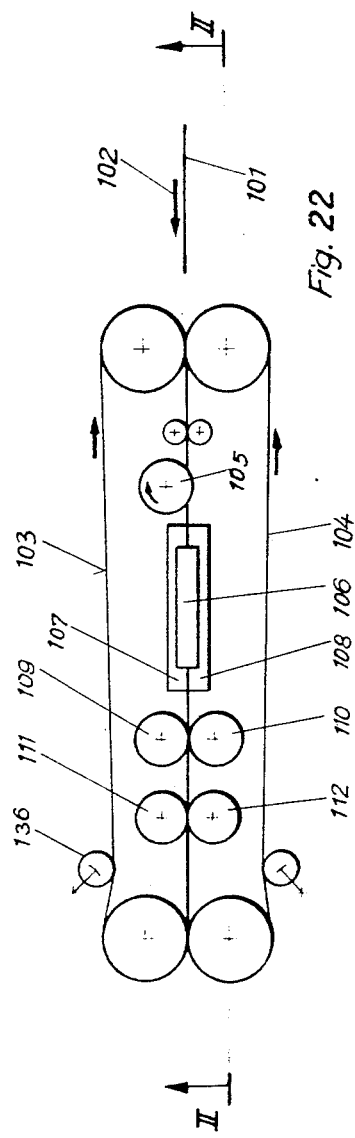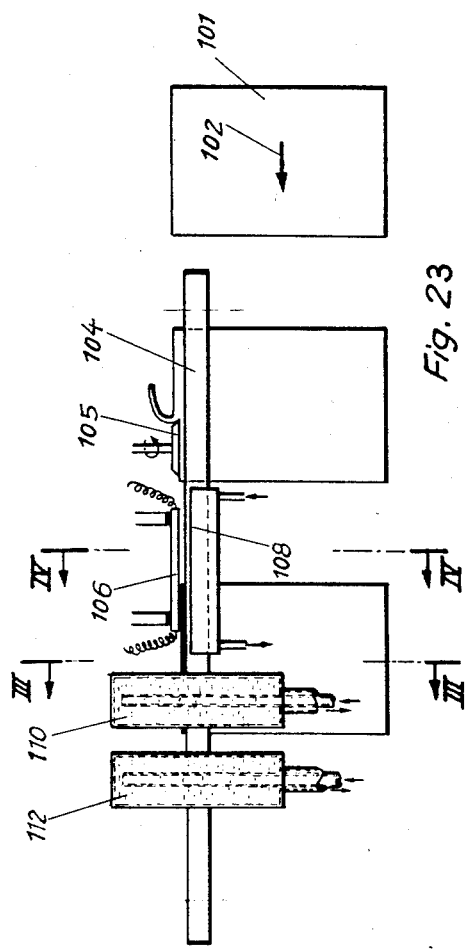

3,413,175
DEVICE FOR WELDING TOGETHER THE TERMINAL EDGES OF SUPERPOSED LAYERS OF THERMOPLASTIC MATERIAL

Kurt Rochla, Lengerich, Nordrhein-Westfalen, Germany, assignor to Windmoller & Holscher, Lengerich, Germany
Filed Apr. 8, 1963, Ser. No. 271,298
Claims priority, application Germany, Apr. 12, 1962, W 32,032; July 21, 1962, W 32,644; Nov. 24, 1962, W 33,392; Dec. 7, 1962, W 33,485
8 Claims. (Cl. 156—498)

There has been known a method of welding together the terminal edges of superposed layers of thermoplastic material with the aid of two welding rails which are pressed against a marginal portion of the material from opposite sides of the terminal edge thereof, the welding rails being maintained at a temperature which is sufficient to weld the individual layers together. Where this known method is employed with the marginal portions to be welded having a small width, the strength of the resulting welded seam will be low; where the width of the marginal portions is made larger, it will be possible to obtain the desired strength of the welded seam, but a larger amount of material is used in the welded seam so as to necessitate the use of larger blanks of material. It should be noted in this connection that wide welded seams will project outwardly from bags or sacks made of such welded material, the seams forming undesirable and unsightly obstructions having but little resistance to tearing forces.

According to the present invention, the aforementioned drawbacks of the method just described are avoided in a method of welding together the terminal edges of superposed layers of thermoplastic material, particularly for the purpose of closing the open ends of plastic tube sections in the manufacture of sacks or bags, by applying the welding heat in the direction of the planes of the layers of material, the welding heat being introduced into the terminal edges of the layers, whereby the welding heat causes terminal zones of the layers to be molten so as to cause a fusion-welded seam to be produced. During this operation, the layers of material may have full freedom of movement in the area in which the welded seam is formed, and the welding heat may be applied to the terminal edges by radiation. Due to the fact that the layers of material are freely movable, the individual layers, under the influence of the welding heat, will be shortened in the direction of the planes of the layers, this being due to the inherent cohesion and/or superficial contraction, the result being the formation of bead-type welded seams having a high resistance to tearing, such seams being of attractive appearance and projecting only slightly in an outward direction. A particularly important advantage is afforded by the method of the invention in cases in which the number of layers of material to be welded together varies along the length of the welded seam. Where the method of the invention is employed, such variations in the number of layers are no consequence whatever as regards the quality of the welded seam, whereas in the aforedescribed known method of using welding rails urged against the margins of the layers from opposite sides the quality of the welded seam is adversely affected by any variation in the number of layers, if all parts of the welding rails are held at a uniform temperature.

According to another feature of the invention, the edge of the layers of material may, after the formation of the fusion-welded seam, be subjected to a compacting pressure which is applied either to the fusion-welded seam itself or to a narrow strip of the layers of material immediately to the rear of the fusion-welded seam. This application of a compacting pressure results in particularly strong and durable welded joint, particularly in cases in which layers of different width are superposed so that the total thickness of the material varies at the transition points, the same beneficial effect being obtained as the lateral edges or the lateral folds of the layers of material where such edges or folds are formed by folding or being the interconnected layers. The application of the said compacting pressure prevents the inherent elasticity of the bent portions from slightly spreading the edges in such a manner as to stress the welded seam before its complete solidification. It is possible, particularly in cases in which the compacting pressure is applied to a narrow zone of the layers of material to the rear of the fusion-welded seam, to apply the compacting pressure while the material is subjected to the pressure welding temperature, it thus being possible to produce an additional welding effect. Besides that it is possible, upon completion of the fusion welding step and, where desired, of the pressure welding step, to cool the edge of the material, the compacting pressure being maintained at least during part of the cooling period. This serves to ensure that the strength of the fusion-welded seam and of the pressure-welded seam will be maintained also at room temperature.

According to a particularly advantageous feature of the invention, it is possible to produce a uniform temperature gradient in a direction perpendicular to the welded seam in the zone of the layers of material heated beyond the point of softening by the welding heat. It is of great importance to avoid temperature discontinuities in the zone of the layers of material plastified by the welding heat, as any temperature discontinuities might produce changes in the structure of the material, such changes causing a reduction in strength. For the purpose of obtaining a uniform temperature gradient it is possible to cause the margins of the layers of material to be welded to extend beyond the holding members engaging the material from opposite sides to such an extent towards the welding tool, and to regulate the supply of heat in such a manner as to prevent the material from being heated beyond the softening point thereof beyond a point in advance of the clamping zone. According to the invention, it is generally sufficient to provide a zone of the material at least 3 mm. (about ⅛ in.) in width between the clamping zone and the fusion-welded seam. It will be understood that, with the holding or clamping members being at room temperature, the cross-section available for the dissipation of heat at the clamping point will be abruptly increased between the clamping members. It is at this point that a sudden change in temperature could occur if the welding heat caused the material to be plastified up to the clamping zone. After the formation of the welded seam, the portions of the layers of material extending beyond the holding members may be cooled for the dual purpose of preventing any further spreading of the heat conducted within the layers of material and of permitting the method of the invention to be performed within the shortest possible time.

For the purpose of obtaining the desired uniform temperature gradient, it is also possible to heat in a suitable manner the parts of the clamping members located opposite the welding tool. Heating the clamping members at the clamping zone to a temperature approximating the temperature of the heated layers of material will also prevent any sudden increase in the dissipation of heat which might produce a sudden change in temperature entailing changes in the structure of the plastic material.

A device adapted to carry into practice the method of the invention comprises a welding tool having a welding surface extending perpendicular to the planes of the layers of material, and two oppositely disposed movable clamping members capable of engaging the superposed layers from opposite sides. For the purpose of insuring the formative of the aforementioned bead-type welded seam, with the marginal zones of the layers forming the seam being freely movable, the clamping member may be arranged in such a manner that, at least before the formation of the welded seam, the terminal margins of the layers of material extend by a certain amount beyond the clamping members and towards the welding tool. The edges of the clamping members facing the seam to be formed may be rounded or bevelled to match the cross-sectional shape of the welded seam to be formed.

In a preferred embodiment of a device according to the invention, the clamping members are formed as clamping jaws which are movable towards and away from each other at right angles to the planes of hte layers of material.

During their closing motion the clamping jaws will engage the layers of material from either side, the layers, where desired, extending beyond the jaws towards the welding tool, and will hold the layers in position until the radiant heat acting upon the said terminal edges has produced a fusion-welded seam. For the purpose of applying the compacting pressure mentioned earlier, there may be provided two pressing rails which are movable towards and away from each other at right angles to the planes of the layers of material, the said pressing rails being disposed on the side of the clamping jaws facing the welding tool, the pressing rails being movable in relation to the clamping surfaces of the clamping jaws holding the layers of material in a position in which they extend beyond the jaws toward the welding tool. After the fusion-welded seam has been formed, the pressing rails are urged against the marginal zone of the material still extending beyond the clamping jaws, thus applying the said compacting pressure. Conveniently the pressing rails are made of a material which is a good conductor of heat, for example of copper, and to use pressing rails capable of being heated during the formation of the fusion-welded seam with the aid of the welding tool, the pressing rails thus being at the proper pressure-welding temperature as they are brought into contact with the projection portions of the layers of material. On the other hand, however, the width of the active surfaces of the pressing rails may equal the width of the projecting portions of the material, and the pressing rails may be provided with cooling means where it is intended not to heat the material beyond its softening point up to the clamping jaws. A particularly advantageous combination of the clamping jaws with the pressing rails may be obtained by providing for at least part of the clamping surface of each jaw to be formed on a clamping piece connected to the associated clamping jaw and being elastic in the direction of motion of the clamping jaws, the active surfaces of the pressing rails being fixedly connected to the clamping jaws and being slightly offset to the rear in relation to the clamping surfaces of the elastic clamping pieces in the unloaded position thereof. With this arrangement, the necessary relative motion between the pressing rails and the clamping surfaces of the clamping jaws is obtained, after the fusion-welded seam has been formed, with the elastic clamping surfaces of the clamping jaws exerting a slight pressure only on the layers of material, by compressing the elastic clamping pieces, the clamping pieces being subjected to extensive elastic deformation, until the pressing rails are brought into contact with the fusion-welded seam.

Where movable clamping jaws are used, it is convenient also to use a movable welding tool having welding rail adapted to be continuously heated by means of resistance wires. In addition there may be provided a stop member which is movable perpendicularly to the plane of the material and adapted to co-operate with the terminal edges of the layers of material, the distance between th surface of the stop member facing the clamping jaws and the latter corresponding to the width of the portion of the layers extending beyond the clamping jaws towards the welding tool. According to the invention, the said abutment or stop member may take the form of a tube through which a coolant is circulated, the tube being adapted to be placed in front of the welded seam upon completion of the formation thereof. According to another feature of the invention, the welding tool may be arranged to be displaced in the direction of the plane of the material for the purpose, for example, of permitting the welding tool to be placed in front of the terminal edges to be welded after the stop member has been withdrawn. The welding tool may further be provided with a drive mechanism adapted to cause the welding tool to approach the terminal edges at a rate corresponding to the rate of melting of the edges. According to another modification, the welding tool may be movable at right angles to the plane of the material and the supporting structure for the welding tool may be provided with an abutment surface. Thus, in its position of rest, the welding tool will be located either above or below the plane of the material, but it will not be moved in a lateral direction so as not to require any additional space. Nor is it necessary in this case to provide a separate stop member and the necessary operating mechanism. The vertically movable welding tool may be provided with a cutting blade serving to trim the layers of material to be welded. For the formation of a clean and strong welded seam it is essential for the terminal edges of the layers to be welded together to be in accurate register. In some cases it is impossible to obtain accurate registry with the aid of a stop member, especially in cases in which layers have to be welded which differ in length in the direction of introduction thereof, for example where it is intended, in the manufacture of bags, to produce a closing seam which also embraces a valve insert. In such cases the trimming blade will ensure proper coincidence of the terminal edges of the superposed layers of material. Using the trimming blade it is also possible in a particularly simple manner to make plastic bags having one end open from a tubular web of material by advancing the web incrementally through the length of a blank required for a bag and by then cutting off the blank from the web. After the blank has been cut off, the bottom seam is formed. In that case the abutment and cooling surface may be formed by the flat side of the blade facing the edges of the material, the opposite flat side of the blade being connected to the hold-down device through which a coolant is being circulated. The cooling surface of the cutting blade may be cooled additionally by providing for the cooling surface to rest against the coolant-carrying part of one of the clamping jaws, the welding tool being in its operating and/or inoperative position.

Where it is intended to form welded seams on both ends of transversely advancing lengths of plastic tubing to be trimmed on one side only, one device including a vertically movable welding tool may be provided for each end of the blank, in which case the device co-operating with the terminal edge to be trimmed includes a trimming blade or knife, whereas the other of the two devices is movable transversely of the direction of travel of the blanks. After the introduction of the blank into the space between the two devices, the blank or work is displaced by the transversely movable device in such a manner that the terminal edges at the other end of the work are brought into the cutting zone of the trimming knife, whereupon the steps of trimming and welding are performed.

In another embodiment of a device according to the invention there are provided, as clamping elements for the edges to be welded, of tubular blanks continuously moving transversely of their longitudinal axis, two superposed endless tensioned metallic ribbons running in opposite directions, the adjacent inner strands of the two ribbons being arranged to engage the tubular blanks at their marginal zones and to move the blanks past the welding tool without the welding tool coming into contact with the edges of the tubular blanks. The tension of the metallic ribbons exerting compressive forces on the blanks from opposite sides permits the formation of satisfactory welded joints, particularly at points where the number of layers of material varies, for example in the case of tubular blanks having lateral folds therein where transitions occur between two and four layers of material. In this case it is preferred to provide the pressing surfaces of the metallic ribbons with a protective coating which is not wetted by the liquidised plastic material.

Where the tubular blanks are fed towards the metallic ribbons in such a manner that the edges of the blanks extend slightly beyond the edges of the metallic ribbons, the bead-type seam will be formed from this surplus material, it being possible in this case to provide for a narrow contiguous zone of the layers of material engaged by metallic ribbons which are urged towards one another to be at a suitable pressure-welding temperature for the purpose of obtaining the reinforcement of the welded seam mentioned earlier. However, it is also possible to provide for the projecting portions of the layers of material from being heated beyond its softening point up to the edges of the metallic bands. In still another embodiment provisions may be made for the metallic bands to be in sliding contact with the welding tool. With this arrangement no bead-type welded seam of the type mentioned earlier will be formed, but a better heating effect is obtained as regards the portions of the metallic bands performing the pressure welding action, and the desirable welded joint comprising a fusion-welded seam merging into a pressure-welded seam will still be obtained, it being understood that a uniform temperature gradient is created in the metallic bands. In the region of the welding station there may preferably be provided suitable cooling elements which are urged together by spring action, these cooling elements engaging the surfaces of the metallic bands remote from the tubular blanks, and the edges of the metallic bands facing the welding tool may extend beyond the said cooling elements. The cooling elements serve to prevent undesirable heating of the metallic bands and hence of the layers of plastic material in an area in which the layers are not to be welded together. At a point downstream of the welding station there may be provided a cooling station comprised of coolant-carrying hollow rollers which are biased towards the metallic bands and which extend beyond the welded edges of the tubular web sections. Thus, the cooling station, while providing a cooling effect, will also apply a compacting pressure to the welded seam, thus also serving to smooth the welded bead and to keep it within predetermined tolerances.

In still another preferable embodiment of the invention, the metallic bands may co-operate with a curved welding tool, the bands being guided along arcuate paths towards cooling rollers provided at the welding station. With this arrangement the various layers of material will be urged together in a particularly efficient manner.

Other objects and features of the invention will become apparent as the description proceeds, especially when taken in conjunction with the accompanying drawing, illustrating certain preferred embodiments of the invention, wherein:

FIG. 1 and FIG. 2 diagrammatically show a first embodiment of a device according to the invention in two different positions thereof;

FIG. 3 is an enlarged cross-sectional view of a welded seam connecting two layers of material shown fragmentarily;

FIGS. 4 and 5 are cross-sectional diagrams showing a second embodiment of the invention in two different positions;

FIGS. 9 to 18 are cross-sectional diagrams showing a fourth embodiment of the invention and various modifications thereof;

FIGS. 22 to 28 are diagrammatic showings of two different embodiments of devices according to the invention adapted to co-operate with continuously moving sections of tubular material.

Figure 6:
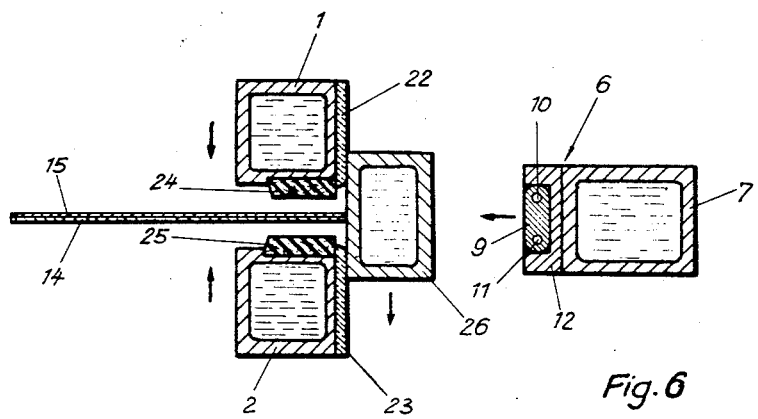
FIGS. 6, 7 and 8 are cross-sectional diagrams showing, in three different positions, a third embodiment of the invention adapted to apply a compacting pressure.

The welding device of simple construction shown in FIGS. 1 and 2 comprises two clamping jaws 1 and 2 capable of being moved towards and away from one another, the clamping jaws being in the form of tubes of rectangular cross-section, a cooling medium being circulated through the interior of the tubes. The edges 4 and 5 of the clamping jaws facing the welded seam to be formed are radiused, thus permitting the formation of a seam having the shape of an enlarged bead. A welding tool 6 is movable towards and away from the clamping jaws in a plane which is perpendicular to the plane of motion of the jaws. The welding tool 6 is comprised, for example, of a beam 7 of rectangular hollow cross-section which may aso carry a stream of coolant 8, and of a welding rail 9 which is adapted to be heated, for example, by two electric resistance heating wires 10 and 11 extending through the welding rail and insulated therefrom. A heat-insulating layer 12 connects the welding rail 9 to the tubular beam 7. The device further includes a stop member 13 of which the surface facing the clamping jaws 1 and 2 is spaced from the adjacent surfaces of the clamping jaws by an amount corresponding to the amount of material it is intended to have project beyond the clamping jaws towards the stop member, this projecting portion of the material being intended to be formed into a terminal welded seam. The stop member 13 is movable in a plane parallel to the plane of motion of the clamping jaws.

With the welding device assuming the position shown in FIG. 1, two superposed layers 14 and 15 of a weldable material or any other desired number of layers may be advanced towards the stop member 13. After the layers of material have come to rest against the stop member, the clamping jaws 1 and 2 are moved towards one another so as to engage the layers 14 and 15 in such a manner that terminal portions of the layers extend slightly beyond the forward edges of the clamping jaws. Following this, the stop member 13 is withdrawn from the path of the layers of material into the position shown in FIG. 2, whereupon the continuously heated welding tool 6 is caused slowly to approach the terminal edges of the layers of material, whereupon the material forming the terminal edges begins to melt. The length of travel of the welding tool 6 may be limited as required by the length of the portions of the layers of material extending beyond the clamping jaws. However, it is also possible to cause the welding tool slowly to follow the receding terminal edges of the material up to a limit position in which the welding tool is closer to the welded seam to be formed.

Thus, the continuously heated welding rail 9 causes, preferably by radiation, the terminal edges of the layers 14 and 15 to assume the welding temperature, it being understood that the portions of the layers extending beyond the clamping jaws are melted in the process. The inherent cohesion and surface tension of the softened material causes the softened material to contract and thus to form a bead-like seam 16 which partly fills the space defined by the rounded corners 4 and 5 of the clamping jaws. As will be seen in FIG. 2, there will remain a gap between the active surface of the welding rail 9 and the welded seam 16 so that there is no risk of the seam being burned. The gap remaining between the welding rail 9 and the two clamping jaws 1 and 2 defines a heat-insulating layer of air between these parts, this layer protecting the welding rail from unnecessary cooling and preventing unnecessary heating of the clamping jaws. Upon the welding operation being completed, the welding tool is withdrawn from its operative position.

FIGS. 4 and 5 illustrate another embodiment of welding device according to the invention in which heating of the welding rail is effected by the heat pulse method. The resistance ribbon 18 which is embedded in the heat-insulating layer 17 and which can be supplied with timed current pulses for the purpose of temporarily heating the ribbon carries no electric current during the intervals between the successive welding operations so that it is not at the welding temperature during such intervals, it thus being possible to use the resistance ribbon as a stop member during the introduction of the layers 14 and 15 to be welded as shown in FIG. 4. According to FIGS. 4 and 5 the welding tool 17, 18, 19 is stationary in relation to the clamping jaw 20 and 21 which may be in sliding contact with the welding tool. Thus, with the clamping jaws closed upon the layers of material, there is defined an enclosed space serving effectively to retain the welding heat. In other respects the clamping jaws 20 and 21 correspond to the clamping jaws of the aforedescribed embodiment of FIGS. 1 and 2. After the layers of material 14 and 15 have been advanced against the welding ribbon 18, the clamping jaws are closed upon the layers of material to hold them in position while a heavy current pulse is applied to the resistance ribbon 18, the current flowing for a short period of time and causing the terminal margins of the layers 14 and 15 to be melted and to be formed into the welded seam 16.

With the two embodiments of welding devices just described it is not until the seam 16 has its strength increased by cooling that the clamping jaws are moved apart to release the work. In order to expedite this cooling action, the welding tool 6 of the first embodiment is withdrawn into its inoperative position of FIG. 1 as soon as the molten material has formed the seam 16. The cooling medium 3, for example water, flowing through the clamping jaws 1 and 2 will then cause rapid cooling and strengthening of the seam. In the case of the second embodiment, too, the coolant flowing through the clamping jaws 20 and 21 will cause rapid cooling of the seam 16. The heating effect of the pulse-fed welding ribbon 18 decreases very rapidly because, due to its small cross-section, it contains only a small amount of heat which, after de-energization of the ribbon, will be quickly dissipated by the cooling medium flowing through the tubular beam 19.

Figure 7:
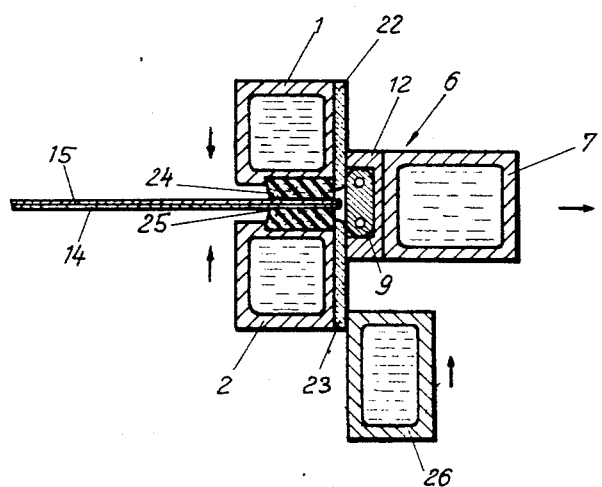
Figure 8:
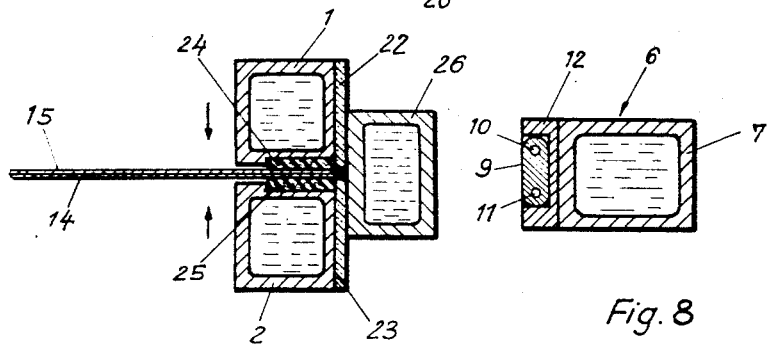

Shown in FIGS. 6 to 8 is a further embodiment of a device according to the invention in which, after the formation of the fusion-welded seam 16, a compacting pressure is applied, for the aforeindicated reasons, either to the bead-like seam or to a narrow zone of the layers 14 and 15 lying immediately to the rear of the seam. The clamping jaws 1 and 2 and the welding tool 6 are of substantially the same design as in the embodiment of FIGS. 1 and 2. However, each of the clamping jaws 1 and 2 is provided on its side facing the welding tool 6 with a pressing rail 22 and 23, respectively. While the pressing rails will not come into contact with the bead-like seam formed during the fusion-welding step, they will be forced against the terminal portion of the layers of material while the material is still in a sufficiently soft condition so that the layers are welded together by the action of the pressure. For the purpose indicated the pressing rails 22 and 23 may be movable in relation to the clamping jaws 1 and 2, they may be forced against the layers of material by suitable operating mechanism not shown, and may be automatically withdrawn into their inoperative positions upon completion of the compacting step.

It will, however, be understood that FIGS. 6 to 8 show special provisions by which the necessary motion of the pressing rails in relation to the clamping surfaces of the jaws 1 and 2 can be imparted in a simple manner. It will be seen in FIGS. 6 and 8 that the surfaces of the clamping jaws 1 and 2 facing the layers of material 14 and 15 are each fitted with an elastic clamping piece 24 and 25, respectively, preferably made of silicone rubber, these clamping pieces being adapted to engage the layers of material 14 and 15 upon being compressed elastically to a small extent only. In this position shown in FIG. 7 the pressing rails 22 and 23 fastened to the end faces of the clamping jaws 1 and 2 will not engage the layers of material. However, as soon as the bead-like welded seam has been formed on the ends of the layers, the clamping jaws together with the pressing rails carried thereby will be further moved towards one another in such a manner as to ensure the application of the desired compacting pressure to the edge of the layers or the bead-like seam, respectively. This additional motion of the clamping jaws is rendered possible by the elastic clamping pieces 24 and 25 which are further compressed during this step.

The shape of the edges of the pressing rails 22 and 23 acting upon the layers of material is chosen to match the desired shape of the bead-like seam; for example, the edges of the pressing rails may be beveled divergingly towards the welding tool, or they may be of concave part-cylindrical shape or formed in any other desired or suitable manner. Moreover, the said edges may be formed with embossed or engraved patterns and thus be adapted to mark or identify certain products.

In a modification the pressing rails may be formed on their sides facing the clamping jaws 1 and 2 with a ledge-like projection which, during the pressing step, will engage the layers of material 14 and 15 directly to the rear of the bead-like seam to press the layers together and thus to cause an additional narrow zone of the layers to be welded together to the rear of the bead-like seam.

The pressing rails are made of a material which is a good conductor of heat, for example of copper or the like, and are brought to a temperature which is suitable for the performance of a pressure-welding step. This temperature of the pressing rails may be obtained by causing the rails to contact a welding rail of suitable width during the formation of the bead-like welded seam. However, it is also possible to make provisions for separately heating the pressing rails, the heating action being controllable so as to meet varying requirements.

The welding tool 6 which is of the construction described earlier is brought into contact with the pressing rails 22 and 23 during the welding operation. The device of FIGS. 6 to 8 further includes a reciprocable stop member 26 which, in the present case, takes the form of a rectangular tube through which a stream of coolant is conducted. While the layers of material 14 and 15 are being introduced into the device as shown in FIG. 6, the stop rail 26 abuts the pressing rails 22 and 23, thus defining the length of the portion of the layers extending beyond the clamping jaws towards the welding tool. The thickness of the pressing rails corresponds to the length of the said portions of the layers. Conveniently, the stop rail 26 is slidably guided on the pressure rails.

The operation of the device which may be controlled by a suitable programming unit will be appreciated from the foregoing description in conjunction with FIGS. 6 to 8. It will be seen in FIG. 8 that after the formation of the fusion-welded seam, and while the clamping pieces 24 and 25 are in their elastically compressed condition after having been moved further together, the welding tool 6 has already been retracted into its inoperative position, whereas the stop rail 26 through which the coolant is being passed has been brought into position in front of the welded seam in order to cool the seam and the pressing rails 22 and 23. After the temperature has been reduced sufficiently, the clamping jaws 1 and 2 will recede into their original position, whereupon the welded-together and cooled layers of material 14 and 15 will be removed from the device. It will be understood that the continuously heated welding rail 9 may be replaced by a welding rail adapted to be heated by the aforedescribed pulse heating method.

In the modified embodiments of the device according to the invention shown in FIGS. 8 to 18 the clamping jaws 1 and 2 are again connected to pressure rails 22 and 23, respectively, and carry on their surfaces facing the layers of material 14 and 15 an elastic clamping piece 24 or 25 and a rigid clamping piece 27 or 28, respectively. The elastic clamping pieces 24 and 25 are formed in such a manner that, with the device in its position of rest, the clamping surfaces of these clamping pieces extend slightly beyond the clamping surfaces of the clamping pieces 27 and 28 and of the pressing rails 22 and 23, the arrangement being such, however, that, while the clamping jaws 1 and 2 are approaching each other, the clamping pieces 24 and 25 can be compressed to such an extent that their clamping surfaces are flush with the other clamping surfaces mentioned. The elastic clamping pieces 24 and 25 are provided with lateral recesses 29 facilitating resilient yielding of the clamping pieces.

With this embodiment the welding rail 9 is embedded in a steel rail 30 leaving the active surface of the welding rail exposed, the steel rail being in turn supported by heat-insulating members 31 and 32 which may, for example, be made of asbestos cement. Where the welding rail is directly supported by a heat-insulating material, it will be necessary, in view of the fact that the temperature of the welding rail may reach a value of 750° C. (1380° F.), to use a ceramic insulating material, it being understood that such a material is not as readily available as other heat-insulating materials. Where a steel rail is interposed between the welding rail and the insulating material, the temperature of the steel rail at its external surfaces will be considerably lower than in the vicinity of the welding rail, it thus being possible to use readily procurable asbestos cement bodies.

In the embodiments of FIGS. 9 to 18, in contrast to the embodiments described earlier, the welding tool is movable at right angles to the plane of the layers of material 14 and 15 and comprises a supporting body 33 of hollow design including a downwardly projecting extension, a cooling medium being circulated through the supporting body.

Figures 11, 12:
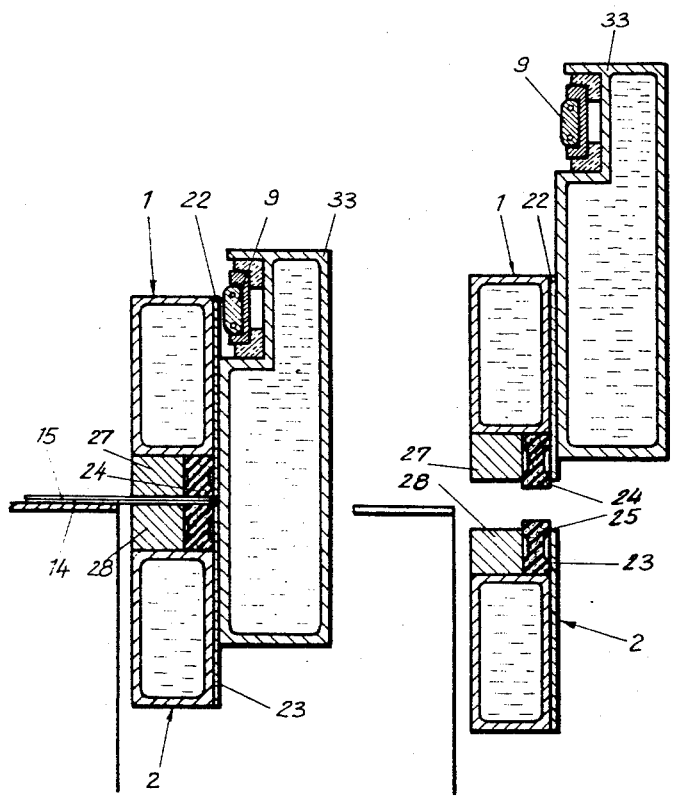

In the case of the modification shown in FIGS. 9 to 12 the two layers of material 14 and 15 to be welded together are advanced between the retracted clamping jaws 1 and 2 while the device is in its starting position of FIG. 9, the layers being advanced until they abut the supporting body 33 so as to be mutually aligned, it being understood that the transverse length of the supporting body is greater than the width of the layers. The following steps of operation of the clamping jaws 1 and 2 are the same as described in connection with FIGS. 6 to 8. While the layers of material 14 and 15 are held in position by the clamping surfaces of the elastic clamping pieces 24 and 25, the supporting body carrying the welding rail 9 is lowered at right angles to the plane of the material until the welding rail 9 is opposite the layers 14 and 15. With the welding rail in this position, the welded seam is formed in the manner described earlier, the pressing rails 22 and 23 being heated simultaneously in the position of FIG. 10; while the compacting pressure is being applied and during the sizing of the welded seam by means of the pressing rails 22 and 23, the supporting body 33 is raised again, causing the abutment and cooling surface thereof to cool the welded seam and the pressing rails. The pressing rails are intentionally heated in their position of FIG. 10, since cooling the welded seam too rapidly during the step shown in FIG. 11 would be detrimental, there being the risk of producing a change in the structure of the plastic material such as to cause weakening of the material. Finally, as shown in FIG. 12, the supporting body 33 carrying the welding rail 9 is raised to such an extent as to remove it entirely from the plane of the material. The layers of material 14 and 15 which have been welded together at their terminal edges may now be removed from the device by further advancing them in the original direction of travel indicated by arrow 34 in FIG. 9.

In the modification shown in FIGS. 13 to 16, the supporting member 33 carries, in addition to the welding rail 9, a cutting blade 35 one side of which is connected to the continuously cooled supporting body 33, the other side of the blade being slideable in relation to the pressing rails 22 and 23. The layers of material 14 and 15 to be welded together are advanced between the retracted clamping jaws 1 and 2 until they extend by a relatively large amount beyond the pressing rails 22 and 23. After the clamping jaws have been moved towards one another to such an extent that the layers of material are engaged not only by the resilient clamping pieces 24 and 25 but also by the rigid clamping pieces 27 and 28, the supporting body 33 carrying the cutting blade 35 and the welding rail 9 is lowered to cause the cutting blade to trim the layers of material between, there may be interposed a valve insert. The rectangular outer edge of the lower pressing rail forms the lower cutting edge co-operating with the cutting blade. While the supporting body 33 continues its downward motion towards the position shown in FIG. 15, the clamping jaws 1 and 2 are moved apart until the rigid clamping pieces 27 and 28 release the layers of material so that the latter are now held by the resilient clamping pieces 24 and 25 only. With the device in the position of FIG. 15, the welding operation is performed in the aforedescribed manner. The position of the device shown in FIG. 16 corresponds to the position of the preceding modification shown in FIG. 11, the cutting blade 35 assuming the function of the cooling surface of the supporting body, since one side of the blade is connected to the supporting body 33 through which a coolant is being circulated, the opposite side of the blade being cooled by the fluid-cooled clamping jaws 1 and 2 via the pressing rails 22 and 23, the blade thus being cooled in its inoperative position of FIG. 13 as well as in its operative position of FIG. 15. Upon completion of the cooling and solidification of the welded seam the supporting member 33 carrying the welding rail 9 and the cutting blade 35 is returned to the position shown in FIG. 13, whereupon the layers of material which have been welded together at their terminal edges may be removed from the device in the direction of arrow 34 in FIG. 13.

Thus, during the production of plastic bags having one open end, it is possible to advance the tubular web in the direction of arrow 34 beyond the cutting line of blade 35 through the length of a single bag, it being understood that the forward end of the section thus extending beyond the cutting line has been provided with a bottom-forming seam during the preceding cycle of the device. After the cutting blade has again been operated during the following cycle, the plastic bag having one open end will have been severed from the tubular web, it now being possible to move the finished bag to a delivery station so as to clear the path of the downwardly moving cutting and welding unit.

It will, of course, also be possible to feed pre-cut tubular web sections at right angles to arrow 34 in a lateral direction and transversely of the longitudinal axis of the sections towards the welding unit, as it is not necessary in this case to advance the material towards a stop member. Since no motion at right angles to the direction of travel is required for the purpose of aligning the work, there results an important simplification in comparison to a method in which the tubular web sections introduced transversely of their longitudinal axis first have to be advanced towards an abutment surface.

Figure 17:
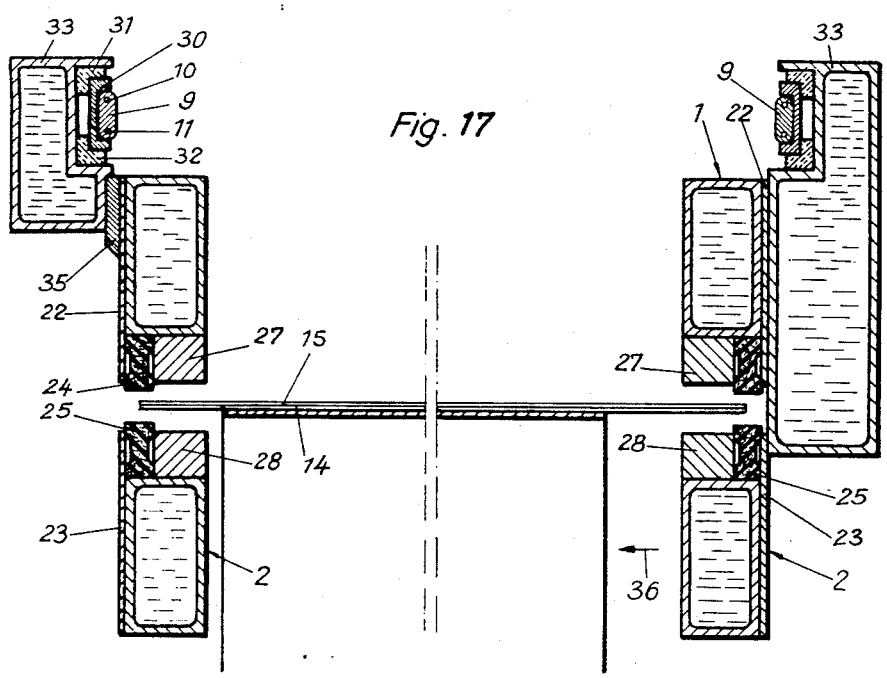
Figure 18:
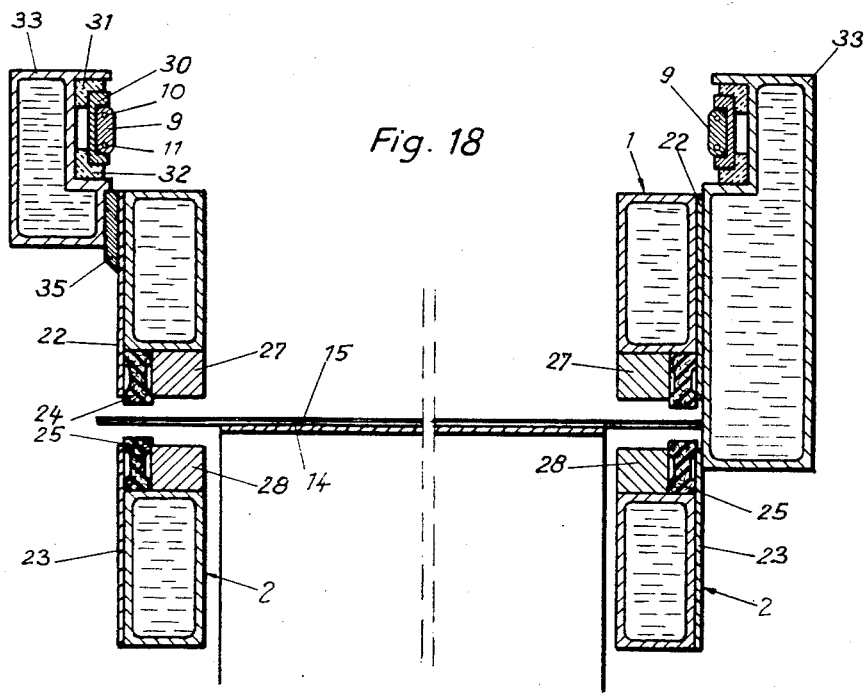

Shown in FIGS. 17 and 18 is a combination of the two last-described modifications, this combination being intended to weld both ends of a transversely moving tubular web section which is to be trimmed at the end carrying the valve. In view of the fact that the workpieces are introduced into the two welding devices at right angles to the direction of arrow 34, the supporting body 33 is not required to be capable of being moved into the retracted position shown in FIG. 12. However, the entire unit shown in the right-hand parts of FIGS. 17 and 18 is movable in the direction of arrow 36 of FIG. 17 and in an opposite direction, i.e. transversely of the direction of travel of the layers of material 14 and 15. After a workpiece has been introduced into the two units in the manner shown in FIG. 17, the right-hand welding unit is advanced in the direction of arrow 36 into the position shown in FIG. 18, this causing the workpiece to be displaced by a certain amount in the same direction so as to bring the right-hand end of the workpiece into contact with the abutting and cooling surface of supporting member 33 for the purpose of properly aligning the workpiece, whereas the left-hand end of the workpiece is projected by a predetermined amount beyond the cutting line of blade 35; following this preparatory step, the two units may be started to perform their operating cycles, the two units working independently, since no cutting step has to be performed at the right-hand end of the workpiece, the number of steps thus being reduced by one on the right-hand side.

The modifications of FIGS. 9 to 18 have in common the feature that the pressing rails 22 and 23 are rigidly secured to the clamping jaws 1 and 2, the presence of the rigid clamping pieces 27 and 28 which are in alignment with the pressing rails permitting the pressing rails to be advanced towards the material to the same extent only to which the rigid clamping pieces can be advanced. Therefore, it is not necessary to make special provisions for limiting the pressing pressure so as to avoid excessive compression of the welded seam and weakening of the seam by reducing its cross-sectional area. Of course, it is also possible to offset the pressing rails 22 and 23 slightly to the rear in relation to the clamping surfaces of the rigid clamping pieces 27 and 28. In this case the welded seam will be slightly thicker than the superposed layers of material 14 and 15.

Figure 19:
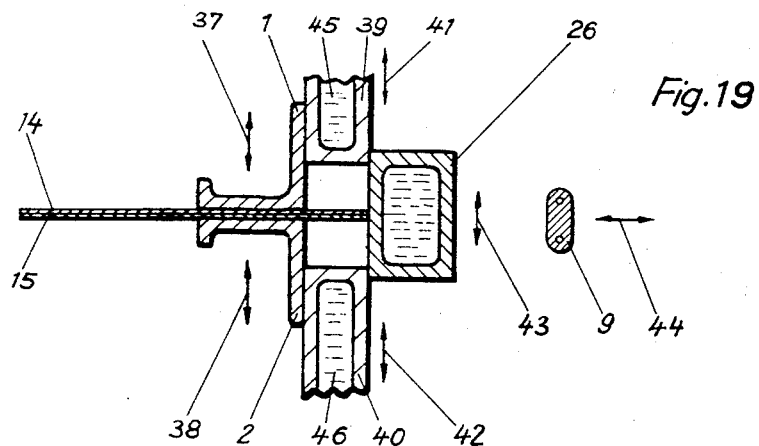
FIGS. 19 to 21 are cross-sectional diagrams illustrating a modification which may be provided in any of the embodiments of the preceding figures.
Figure 21:
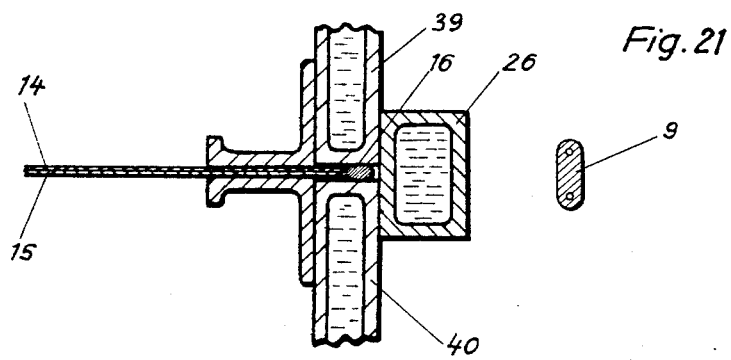

FIGS. 19 and 21 show a modification which may be employed in any of the aforedescribed embodiments. This modification is based on the observation that a sudden change in the temperature of the material may occur at the point at which the layers 14 and 15 are clamped between the clamping jaws 1 and 2 when the length of the portion of the material extending beyond the clamping jaws is very small or when the entire projecting portion is melted during the formation of the welded seam 16. It will be understood that the projecting portion is heated to a very high degree during the formation of the fusion-welded seam, and, due to the dissipation of heat by the clamping jaws, the portions of the material engaged by the jaws will be held at a considerably lower temperature. The sudden change in temperature occurring at the point where the clamped portions of the material are in the vicinity of the welding zone may be detrimental to the structure of the material; in other words, the strength of the material may be reduced upon the material being subjected to a sudden change in temperature. Where it is intended to avoid this phenomenon, the length of the portion of the layers of material 14 and 15 projecting beyond the clamping jaws 1 and 2 may be chosen in such a manner that the amount of heat conducted into the layers before the heat reaches the portions of the layers clamped between the active surfaces of the jaws is sufficiently large to keep the material below its softening point, the result being that the material is not plastified up to the clamping jaws 1 and 2.

Figure 20:
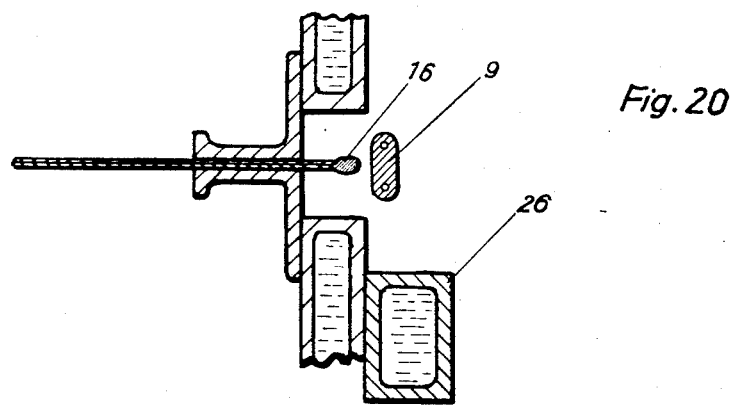

As shown in FIGS. 19 to 21, the clamping jaws 1 and 2 are formed as plain angle sections made of iron and are not provided with cooling means. The clamping jaws are reciprocable in the direction of the double-headed arrows 37 and 38 for the purpose of clamping and releasing the plastic foil layers 14 and 15. Disposed in front of the clamping jaws are pressing jaws 39 and 40 which are also reciprocable in relation to the work in the direction of the double-headed arrows 41 and 42. Arranged in front of the pressing jaws is a stop rail 26 which is movable into and away from its operating position in the direction of the double-headed arrow 43. The device of FIGS. 19 to 21 also includes a welding rail 9 suitably supported in a manner not shown and reciprocable into and away from its operating position in the direction of the double-headed arrow 44. The clamping jaws 1 and 2, not being cooled by special means, are at room temperature. The pressing jaws 39 and 40 have hollow spaces 45 and 46 formed therein for the purpose of permitting a cooling medium to be circulated therethrough.

In a position of the device not shown in the drawing but substantially corresponding to the position shown in FIG. 19, in which position the clamping jaws 1 and 2 have been moved apart, the superposed layers of material 14 and 15 to be welded together are introduced into the device until they come to a stop in abutment with stop rail 26. Then the clamping jaws are closed in the manner shown in FIG. 19 so as to engage the layers of material. Now the stop rail 26 is lowered into the position shown in FIG. 20, while the welding rail 9 is moved into its operative position also shown in FIG. 20, in which position, however, the welding rail does not touch the terminal edges of the layers 14 and 15. Due to the heat radiated by the welding rail, the material exposed to such radiation is melted and caused to contract as a result of a previously performed cold working step, the material thus forming the thickened and shortened seam 16. During this operation the temperature of the material will decrease in a natural manner between the welding zone and the clamping zone, the result being that the material lying to the right and left of the clamping zone will not be heated beyond its softening point, the occurrence of a sudden change in temperature thus being avoided. The length of the portion of the layers 14 and 15 projecting beyond the clamping jaws 1 and 2 is chosen to meet this condition.

Experiments have shown that in the case of a material having a thickness of between 0.2 mm. (0.008 in.) and 0.25 mm. (0.010 in.) an initial length of the projecting portion of 6 mm. (0.24 in.) will be sufficient when the fusion-welded seam is formed by terminal zones of the layers having a width of 3 mm. (0.12 in.), there thus being left a zone having a width of 3 mm. (0.12 in.) between the inner margin of the welded seam and the clamping jaws 1 and 2. Where a material of greater thickness is used, or where it is intended to form a welded seam of greater width, the necessary length of the projecting portion may be calculated taking into consideration the cross-section and the temperature of the seam, the heat conductivity of the material and the thickness thereof. The optimum length of the projecting portion may also be determined empirically by subjecting welded seams produced experimentally to a tearing test. If it is found that the material is easily torn at that end of the zone clamped between the clamping jaws which faces the welded seam, the length of the projecting portion should be increased. In the experiments carried out thus far, a distance of 3 mm. (0.12 in.) between the welded seam and the zone of the material clamped between the clamping jaws has always proved sufficient.

After the welded seam has been formed, the welding rail 9 is returned into the position shown in FIGS. 19 and 21, and the pressing rails 39 and 40 are urged against the seam 16 as shown in FIG. 21 for the purpose of compressing the seam in the desired manner to provide the seam with the desired smooth surface, thickness and strength. At the same time the stop rail 26 is moved into its operative position as seen in FIGS. 19 and 21 in which it contributes to the cooling of the seam. Then the clamping jaws 1 and 2 are returned into their starting position (not shown), the pressing rails 39 and 40 also being returned into their retracted positions of FIG. 19, whereupon the foils 14 and 15 connected by the welded seam 16 are removed from the device to make room for the next workpiece which is then subjected to the same cycle of operations. It will be immediately obvious that the modification just described and diagrammatically shown in FIGS. 19 to 21 may be employed in any of the embodiments described earlier for the purpose of carrying into practice the method of the invention. It will be particularly understood that the welding rail 9 may also be arranged to move at right angles to the plane of the layers of material 14 and 15, that the welding rail may be connected to the stop rail 26, and that a trimming blade may be provided.

Figure 28:
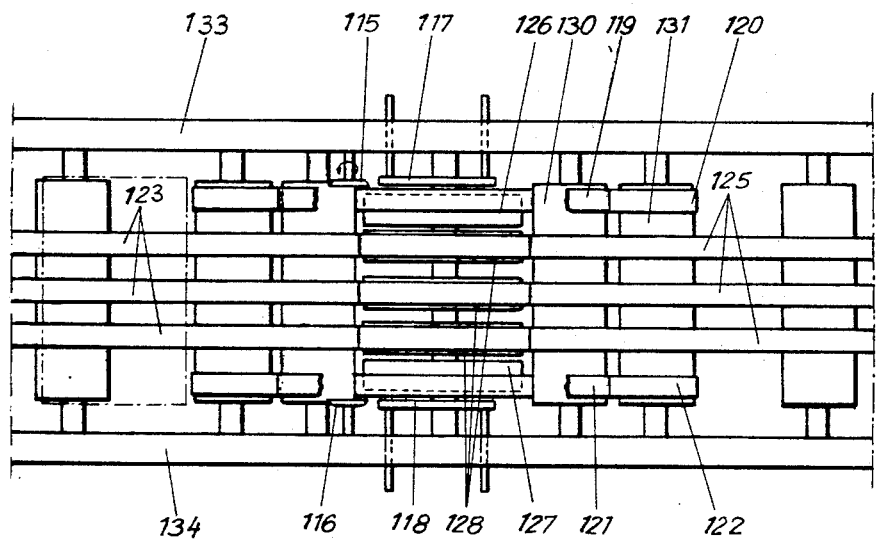

FIGS. 22 and 28 illustrate devices adapted to weld the edges of tubular web sections moving continuously transversely of their longitudinal axis.

As seen in FIGS. 22 and 23, the tubular web sections 101 are fed towards the welding device in a direction extending at right angles to the longitudinal axis of the sections, i.e. in the direction of arrow 102. According to the invention there are provided two endless moving metallic bands 103 and 104, the tubular web sections 101 being fed between the bands by means not shown in the drawing. Other means in addition to the endless bands 103 and 104 are provided for the purpose of moving the tubular web sections in the desired manner during operation of the device, such means having also been omitted in the drawing. With the embodiment of FIGS. 22 to 25 the tubular web sections 101 are introduced between the metallic bands 103 and 104 in such a manner that the end of each section to be closed by a welded seam projects by a certain amount beyond the respective edges of the bands. A rotating knife 105 serves to trim the terminal edges of the tubular web sections and thus to give the projecting portion the desired length. As the tubular web sections are moved past the welding tool 106, the projecting portion is partially melted and transformed into a bead of the kind shown in FIG. 25. The welding tool 106 is heated continuously and its temperature is controlled by a thermostat not shown in the drawing. As seen in FIGS. 22 and 25, there is disposed in the region of welding tool 106 a cooling element 107 above the band 103 and another cooling element 108 below the band 104, the two cooling elements being hollow, a cooling medium being circulated therethrough. The cooling elements 107 and 108 are arranged in such a manner that their lateral surfaces facing the welding tool are slightly offset away from the welding tool in relation to the edges of the bands facing the welding tool. The cooling elements which are resiliently urged towards one another by means not shown function to prevent undesirable heating of the metallic bands 103 and 104 as well as of the layers of plastic material in a zone in which it is not intended to weld the layers together. Thus, the arrangement of the invention makes it possible to interconnect the layers of material by a fusion-welded seam which, in the region of those portions of the metallic bands 103 and 104 which extend beyond the cooling elements 107 and 108, merges into pressure-welded seam as shown in FIG. 25. The satisfactory temperature gradient established between the two limiting temperature prevents the setting-up of undesirable stresses in the welded seam. The portions of the bands 103 and 104 projecting beyond the cooling elements 107 and 108 and serving to produce the pressure welding action are heated by radiant heat emitted by the welding tool 106. After one end of a tubular web section has been closed by the welding operation, the web section is advanced to a cooling station comprising, for example, two pairs 109, 110 and 111, 112 of cooling rollers. The two rollers of each pair are resiliently urged towards one another by means not shown, the rollers serving not only to cool the welded seam but also to compress it in the manner shown in FIG. 24 so that spreading of the layers due to the resilience of the material in the creased edges and the occurrence of flaws in the welded seam are avoided. In addition, the cooling rollers act to smooth the bead-like seam and to keep its thickness within predetermined limits.

With the embodiment of FIGS. 22 to 25 just described the end of the tubular web section to be closed by welding extends beyond the metallic bands 103 and 104 towards the welding tool 106 by a predetermined amount calculated to supply the material required for the formation of the welded seam. In order to provide for better heating of those portions of the metallic bands which perform the pressure-welding action, it is possible, as shown in FIG. 26, to cause the tubular web sections not to extend beyond the metallic bands, and to arrange the welding tool 106 in direct contact with the adjacent longitudinal edges of the bands. While this arrangement will not afford a bead-like welded seam, the advantage will be retained which resides in the fact that a fusion-welded seam will be produced which merges into a pressure-welded zone.

Figure 27:
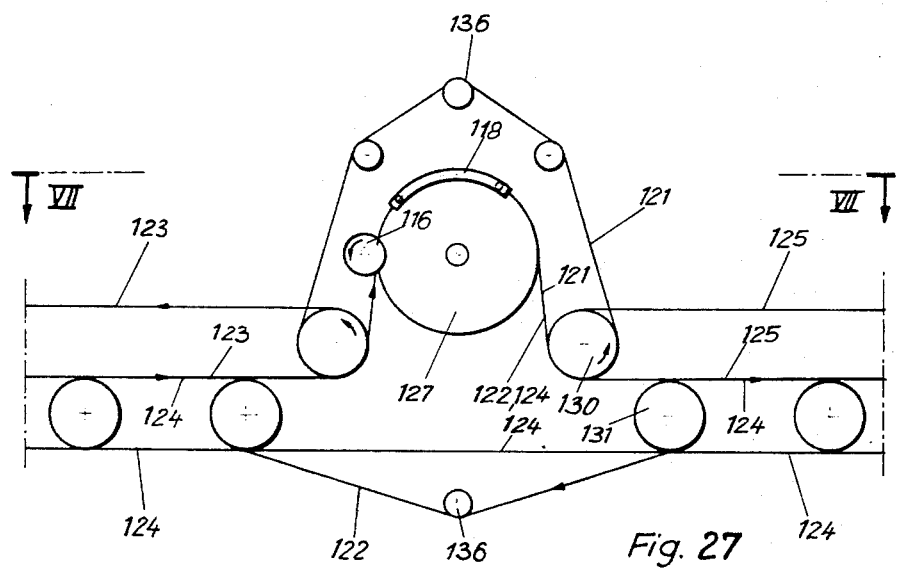

FIGS. 27 and 28 illustrate a modification of the embodiment shown in FIGS. 22 and 23, there being no difference between the two embodiments as regards the method employed to close the ends of the tubular web sections by welding. As distinguished from the embodiments of FIGS. 22 and 23, the embodiment of FIGS. 27 and 28 is not intended for the manufacture of bags having one open end; the modification is provided with knives 115 and 116 serving to trim both ends of each tubular web section, and two welding tools 117 and 118 are provided for the purpose of closing both ends of the web sections by welding. In this case each web section has been previously provided with a valve.

In the device of FIGS. 27 and 28 the tubular web sections one of which is indicated in FIG. 28 by dash lines are each carried through an arc during the welding operation. In contrast to the embodiment of FIGS. 22 and 23, this arrangement affords an advantage in that the layers of material to be welded together and more efficiently urged towards one another.

For each end of the tubular web section to be closed by welding there is provided a pair of endless steel bands 119, 120 and 121, 122, respectively. Three upper parallel conveyor belts 123 serve in co-operation with three lower parallel conveyor belts 124 to introduce the individual tubular web sections into the device, whereas three upper parallel conveyor belts 125, in co-operation with the lower conveyor belts 124, serve to discharge the tubular web section after their ends have been closed by welding. As shown in FIG. 28, the steel bands 119 and 120 are trained over a cooling drum 126, and the steel bands 121 and 122 seen in FIGS. 27 and 28 are trained over a cooling drum 127. In similarity to the cooling elements 107 and 108 of FIG. 25, the cooling drums 126 and 127 are slightly offset to the rear in relation to the associated outer edges of the steel bands. As seen in FIG. 28, the conveyor belts 124 are trained over guide rollers 128 disposed coaxially with the cooling drums 126 and 127 and having the same diameter as the latter.

Figure 24:
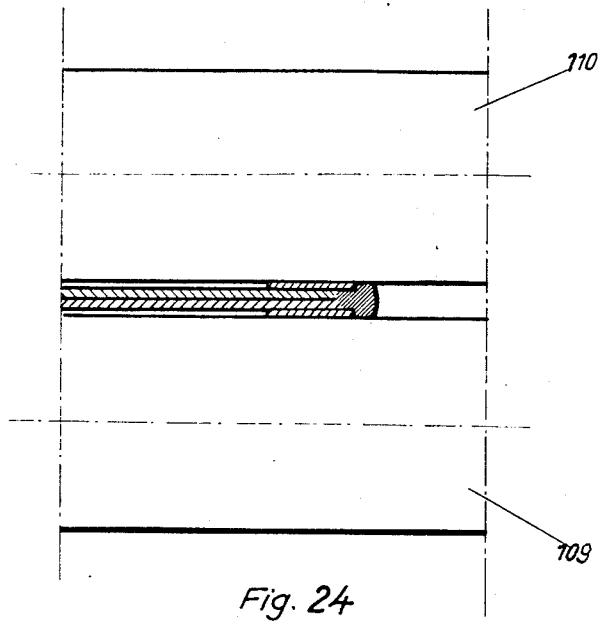
Figures 25, 26:
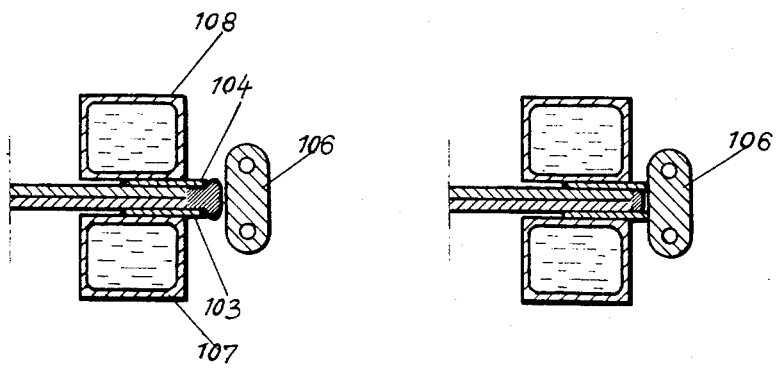

The guide rollers 130 and 131 are designed to act as cooling rollers and correspond to the rollers 109 to 112 of the embodiment of FIGS. 22 to 24; when viewed in the direction of travel of the tubular web sections, the guiding and cooling rollers 130 and 131 are disposed downstream of the cooling drums 126 and 127. To enable the formation of welding seams according to FIG. 25 as well as according to FIG. 26, the welding tools 117 and 118 are supported by members 133 and 134 of the frame of the device in such a manner as to be adjustable transversely of the direction of travel of the tubular web sections. In similarity to the welding tool 6 of the device shown in FIGS. 1 and 2, the welding tools 117 and 118 are arranged for continuous heating, their temperature being controlled by thermostats.

Those surfaces of the metallic bands 103, 104 and 119 to 122 which come into contact with the plastic material are provided with a protective coating serving to prevent the liquid plastic from adhering thereto. Such coatings may be of a semi-permanent nature and may have to be renewed from time to time. According to a known method it is also possible to move the metallic bands past suitable felt wicks which are supplied with silicone oil by a dropping device. For the purpose of tensioning the metallic bands 103, 104 and 119 to 122 there may, for example be provided tensioning rolls 136 which are spring-urged against the associated bands.

In contrast to the construction of the embodiment shown in FIG. 28 in which all of the rollers and drums are disposed between the two side walls 133 and 134 of the frame structure, the rollers and drums being journaled in the said side walls, it is possible, according to another feature of the invention, to arrange the walls of the frame structure between the endless steel bands 119, 120 or 121, 122, respectively, and the conveyor belts 123 to 125. In that case, each wall of the frame structure is split in the region of the path of the tubular web sections, and the rollers and drums are fly-mounted. This arrangement affords the possibility to install and remove or to renew the steel bands without difficulty, it being understood that such operations will be required from time to time due to the wear of the bands and for the purpose of renewing the protective coatings. For example, the upper sections of the side walls may be connected to the lower sections thereof by bridge members extending externally of the region of the steel bands, the ends of the tubular web sections then moving between the limbs of the generally U-shaped bridge members. In this case, the welding tools 117 and 118 are adjustably mounted in supporting members attached to the upper sections of the side walls.

The devices of FIGS. 22 to 28 make it possible in a novel manner continuously to produce welded seams of uniform high quality and good appearance, the seams comprising a fusion-welded portion merging into a pressure-welded portion. In this regard it is of importance to provide suitably arranged cooling elements ensuring that even after prolonged operation of the device no excessive and uncontrollable heating of the steel bands will occur, as this would result in the formation of defective welded seams.

The devices shown in FIGS. 22 to 28 may also be used to carry out the method employed in the devices of FIGS. 19 to 21; for this purpose the length of the portion of the tubular web sections 101 projecting beyond the metallic bands 103 and 104 is adjusted by suitably positioning the trimming knife 105 and the welding tool 106 in such a manner that after the formation of the welded seam there will remain a zone of material having a width of at least 3 mm. (0.12 in.) between the fusion-welded seam and the edges of the bands or belts so that the heating of the material of the tubular web sections 101 beyond the softening point will not progress up to the portions lying between the metallic bands 103 and 104. Also in this case the cooling rollers 109 to 112 may serve to produce a smoothing, cooling and compacting effect.

While several embodiments described herein are at present considered to be preferred, it is understood that various modifications and improvements may be made therein, and it is intended to cover in the appended claims all such modifications and improvements as fall within the true spirit and scope of the invention.

What is claimed is:

1. A device for welding together the terminal edges of superposed layers of thermoplastic tubular web sections comprising at least one welding tool having a welding surface extending at right angles to the plane of the sections, at least one pair of endless oppositely traveling tensioned bands disposed one above the other and adapted to engage the sections from opposite sides with a portion of the web sections extending so that a zone of material having a width of at least 0.12 inches is retained between the point of engagement with the bands and the fusion-welded seam to be formed, means to move said bands so that a succession of the tubular web sections moves continuously transversely of their longitudinal axes, the mutually facing stretches of the bands functioning to move the edges of the tubular web sections past said at least one welding tool without the welding tool coming into contact with the said edges, and a cooling station being constituted by hollow rollers through which a cooling medium is circulated, the rollers being urged toward the bands and extending beyond the edges of the tubular web sections which have been welded together.

2. The device of claim 1 wherein the active surfaces of the bands are provided with a protective coating of a material incapable of being wetted by liquidized plastic material.

3. The device of claim 2 wherein the protective coating consists of silicone oil, and further comprising a felt member supplied with silicone oil by a drop feeder being disposed in contact with each band.

4. The device of claim 1 further comprising a trimming knife disposed at a point in advance of the point at which the tubular web sections are introduced between the bands.

5. The device of claim 1 further comprising cooling elements preferably spring-urged and disposed in the region of the welding station in contact with the surfaces of the bands remote from the tubular web sections, wherein the edges of the bands facing the welding tool extend beyond the cooling elements.

6. The device of claim 1 further comprising cooling rollers guiding the bands along arcuate paths in the welding station, and wherein the welding tool has a curved cross-sectional shape.

7. The device of claim 1 wherein the welding tool is supported in a frame structure in such a manner as to be adjustable transversely of the direction of travel of the tubular web sections.

8. The device of claim 1 wherein said device is adapted to produce valve-fitted bags having both ends thereof closed, and there are two pairs of bands supported by a frame structure, the walls of which are disposed between the two pairs of bands and are split in the region of the path of travel of the tubular web sections, the upper members of the walls being connected to the lower members thereof by U-shaped bridging members preferably extending externally of the region of the bands, and further comprising at least one fly-mounted cooling roller.

References Cited

UNITED STATES PATENTS

| | | | |
|---|---|---|---|
| 2,488,212 | 11/1949 | Lloyd | 156—306 |
| 2,679,469 | 5/1954 | Bedford | 156—306 |
| 2,682,910 | 7/1954 | Piazze | 156—272 |
| 3,066,064 | 11/1962 | Pommer | 156—583 |
| 3,087,845 | 4/1963 | Patterson | 156—306 |
| 3,131,623 | 5/1964 | Seefluth | 156—583 |
| 2,606,850 | 8/1952 | Piazze | 156—499 |
| 2,691,474 | 10/1954 | Olson | 156—499 |
| 2,979,113 | 4/1961 | Stageberg | 156—499 |

DOUGLAS J. DRUMMOND, *Primary Examiner.*